Nov. 1, 1966 C. O. GLASGOW 3,282,296
BALANCED VALVE HEAD ASSEMBLY
Filed June 12, 1964 2 Sheets-Sheet 2
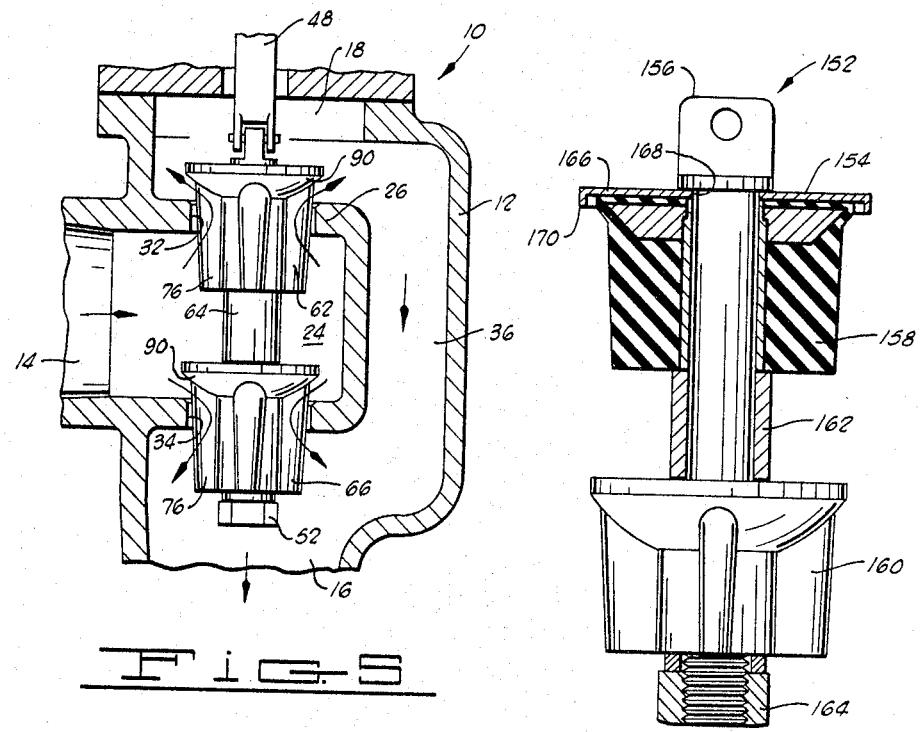
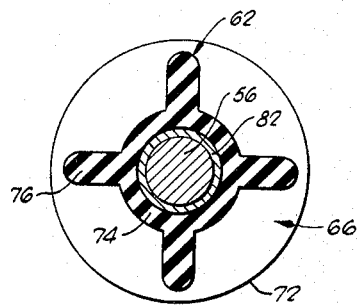
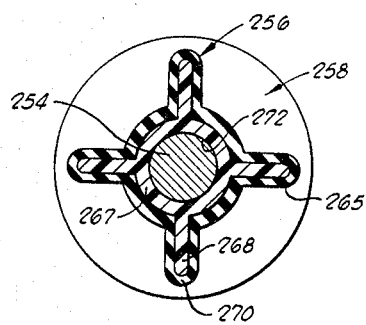
INVENTOR.
CLARENCE O. GLASGOW
BY
ATTORNEYS

United States Patent Office 3,282,296
Patented Nov. 1, 1966

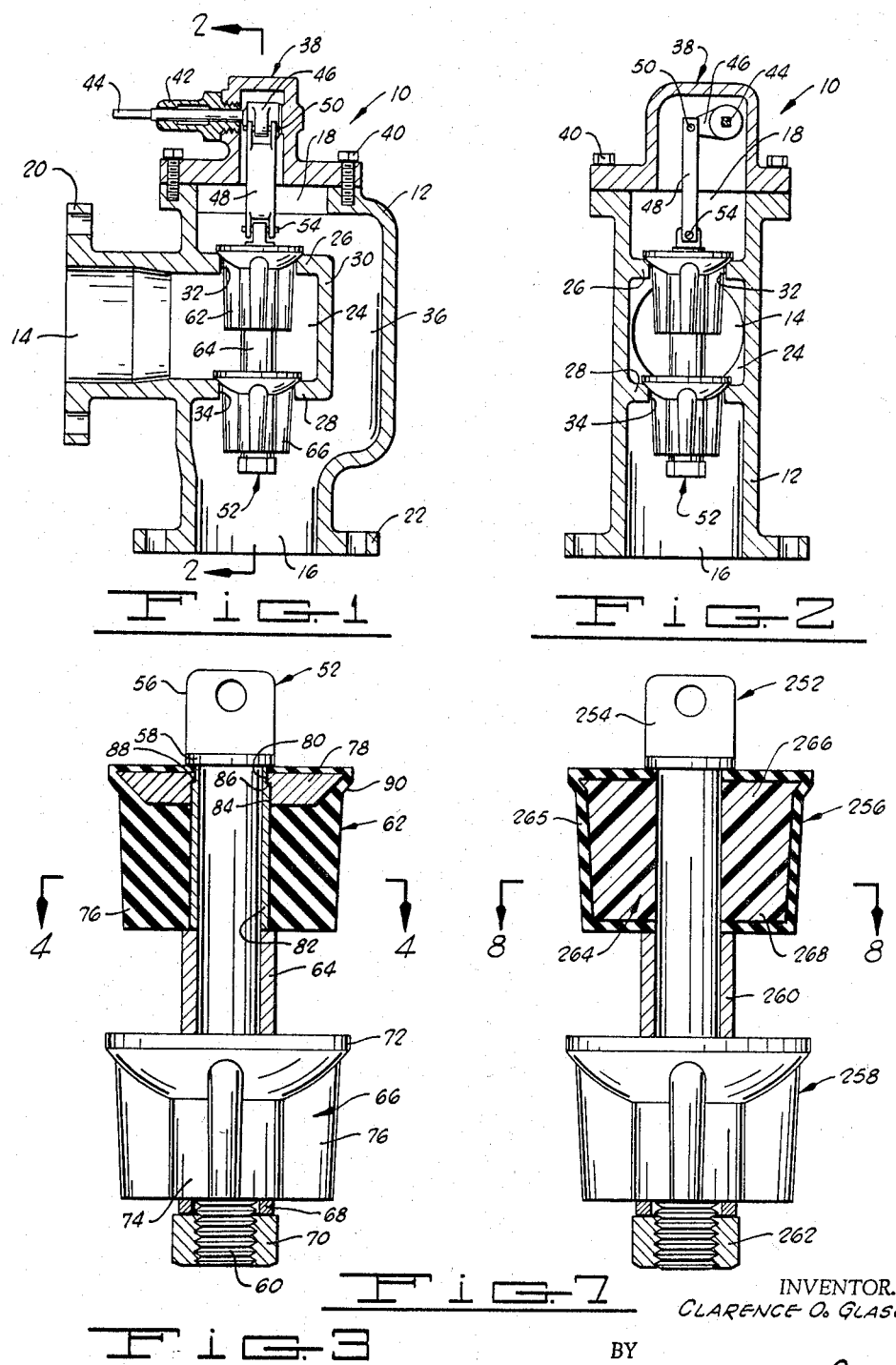

3,282,296
BALANCED VALVE HEAD ASSEMBLY
Clarence O. Glasgow, 2620 S. Yorktown, Tulsa, Okla.
Filed June 12, 1964, Ser. No. 374,576
7 Claims. (Cl. 137—625.34)

This invention relates generally to improvements in valves useful in controlling the flow of fluid through conduits or the like. More particularly, but not by way of limitation, this invention relates to an improved valve body and valve head assembly useful in balanced valves.

Balanced valves, to which this invention appertains, are those having a pair of internal ports or apertures located in a single valve body and communicating with a single inlet and a single outlet. The apertures are opened and closed simultaneously by a valve head assembly having spaced valve heads. The apertures are substantially the same size so that the force resulting from fluid pressure in the valve will be substantially equal on the members closing the apertures.

United States Patent No. 2,998,027, issued to Chester L. Sharp on August 29, 1961, for "Balanced Valve," clearly illustrates the type of valve referred to above. The valve disclosed in the Sharp patent and the present invention are, at least partly, directed to providing a means to compensate for relative dimensional changes in the cooperating valve parts which occur as a result of environmental temperature changes.

In the Sharp valve, and in most other balanced valves constructed in the past, the valve body includes an inner and outer chamber. The inner chamber is defined by a tube-like portion having a closed end and extending into the valve body. The flow apertures are formed in the tube-like portion. The outer chamber is defined by the exterior wall of the tube-like portion and the interior wall of the valve body. Fluid flowing through the valve passes from the inlet, through the inner chamber, through the apertures, into the outer chamber, and then into the valve outlet. Sharp, with some success, stabilizes the relative dimensional changes between the tube-like portion and the remainder of the valve body by providing means on the bonnet for anchoring the tube-like portion to the remainder of the valve body.

The outer chamber in balanced valves previously constructed has been kept small due to the desirability of reducing the overall size and weight of the valve. When such valves are utilized for handling fluids containing solid materials, such as paraffin, which tend to agglomerate on surfaces with which the fluid comes in contact, the small outer chamber soon becomes plugged, or at least seriously obstructed.

Furthermore, the various structural arrangements used in forming the valve head assemblies have proved to be rather expensive, as well as difficult to replace in the field. By valve head assembly is meant the operating member that is movably positioned in the valve to open and close the flow apertures.

Most valve head assemblies constructed in the past have included various arrangements of metal parts and some also included O-rings or resilient sealing rings postioned in the valve heads. Due to the use of metal to form the valve head assemblies, extremely close tolerances had to be maintained between the cooperating parts of the valve. Resilient sealing rings provided in the valve heads have reduced the dimensional requirements to some extent, but the means provided to retain the sealing rings further complicate the structure of the assemblies. It is manifest that the more complex the structure, the higher will be the cost. Also, the metal parts were subjected directly to the corrosive and erosive influence of fluid flowing through the valves because of the location of the valve head assemblies in balanced valves.

This invention comprises an improved valve including a valve body having an inlet opening, a chamber in the valve body and connected with the inlet opening, and a pair of apertures connecting the chamber with a relatively large passageway and with an outlet opening in the valve body. The invention further includes an improved valve head assembly useful in connection with the valve of this invention as well as with many previously contsructed balanced valves. The improved head assembly includes a pair of spaced valve heads formed in part from resilient material mounted on a valve stem. The valve heads are provided with integral guide portions and are adapted to be moved to simultaneously and sealingly engage the walls of the chamber surrounding and defining the apertures, thereby closing the valve.

More specifically, the present invention comprises an improved valve head assembly including first and second valve heads located on an elongated valve stem, a tubular spacer member disposed on the stem between the valve heads, and means for retaining the valve heads and spacer on the stem. Furthermore, each of the valve heads is formed from a resilient material and includes a frusto-spherical portion, a cylindrical portion extending therefrom, and a plurality of radially projecting guide portions extending from the frusto-spherical portion and along the cylindrical position. A disc-like reinforcing member is imbedded in the frusto-spherical portion and a tubular reinforcing member extends axially through the cylindrical portion and cooperates with the disc-like reinforcing member to support the resilient material forming the valve heads.

One object of the invention is to provide an improved balanced valve having the valve body constructed in such a manner as to alleviate dimensional changes resulting from environmental temperature changes.

Another object of the invention is to provide an improved balanced valve having a large fluid flow passageway while maintaining a relatively small overall size and weight.

An additional object of the invention is to provide an improved balanced valve having a valve head assembly that can be quickly and easily removed and/or replaced in the field.

Still another object of the invention is to provide an improved balanced valve that can be economically manufactured.

A further object of the invention is to provide an improved valve head assembly that resists wear and corrosion.

A still further object of the invention is to provide an improved valve head assembly that can be easily and economically manufactured.

One other object of the invention is to provide an improved balanced valve incorporating means for varying the spacing of the valve heads so that the valve head assemblies can be readily utilized in valve bodies having a variation in the distance between the seating surfaces.

The foregoing and additional objects and advantages of the invention will become more apparent as the following description is read in conjunction with the accompanying drawings wherein like reference characters denote like parts in all views, and wherein:

FIG. 1 is a view, partly in cross-section, of one embodiment of a valve constructed in accordance with the invention;

FIG. 2 is a cross-sectional view of the valve of FIG. 1, taken along the line 2—2 of FIG. 1;

FIG. 3 is an enlarged view, partly in elevation and partly in cross-section, of a valve head assembly also constructed in accordance with the invention;

FIG. 4 is a cross-sectional view of the valve head assembly of FIG. 3, taken along the line 4—4 of FIG. 3;

FIG. 5 is an enlarged view, partly in cross-section, showing a portion of the valve of FIG. 1 in an open position;

FIG. 6 is an enlarged view, partly in elevation and partly in cross-section, of a modified form of the valve head assembly of FIG. 3;

FIG. 7 is an enlarged view, partly in elevation and partly in cross-section, of another embodiment of a valve head assembly useful in the valve of FIG. 1; and, FIG. 8 is a cross-sectional view of the valve head assembly of FIG. 7, taken along the line 8—8 of FIG. 7.

Referring to the drawings, and to FIGS. 1 and 2 in particular, shown therein is a valve constructed in accordance with the invention and generally designated by the reference character 10. The valve 10 includes a valve body 12 which is provided with an inlet opening 14, an outlet opening 16, and a valve stem opening 18. As illustrated, circumferentially extending flanges 20 and 22 surround the inlet opening 14 and outlet opening 16, respectively. The purpose of the flanges 20 and 22 is to provide a means for connecting the valve 10 with sections of conduit (not shown), and it should be understood that the valve body 12 surrounding the inlet opening 14 and outlet opening 16 could be threaded or otherwise arranged for connection with sections of conduit.

The valve body 12 also includes a chamber 24 connected with the inlet opening 14. The chamber 24 is formed within the valve body 12 by upper and lower transversely extending partitions 26 and 28, respectively, and by a vertical partition 30 which extends between the ends of the upper and lower partitions 26 and 28. Apertures 32 and 34 extend through the upper and lower partitions 26 and 28, respectively, connecting the chamber 24 with the valve stem opening 18 and with the outlet opening 16. A relatively large passageway 36 extends along the vertical partition 30, providing fluid communication between the outlet opening 16 and the valve stem opening 18. As shown more clearly in FIG. 2, the upper and lower transversely extending partitions 26 and 28 are connected with the walls of the valve body 12. The chamber 24 thus formed by the partitions 26, 28 and 30 is rectangular in both transverse and longitudinal cross-section, and extends completely across the valve body in one direction so that the only flow path between the aperture 32 and the outlet opening 16 is that constituted by the large passageway 36, which is also rectangular in cross-section. With the partitions 26 and 28 constructed in this manner, it can be appreciated that the passageway 36 extends vertically past what may be described as the end of the chamber 24.

In the preferred form of the valve body 12, the passageway 36 has a minimum dimension, as measured from the vertical partition 30 to the adjacent wall of the valve body 12, which is greater than one-half the maximum dimension of either of the apertures 32 or 34. Constructing the passageway 36 in the aforedescribed relative size provides an adequate flow area and, at the same time, presents a minimum of wall surface in contact with the fluids flowing through the passageway 36. Reducing the surface area in contact with fluids which contain materials such as paraffin, effectively reduces the rate at which such materials will deposit on the walls, thereby increasing the service life of the valve 10.

The valve stem opening 18 is covered by a bonnet 38 which is securely attached to the valve body 12 by a plurality of bolts 40. The bonnet 38 is provided with a packing gland 42 which rotatably journals a shaft 44 extending through the packing gland 42 and the wall of the bonnet 38. In addition, the gland 42 provides a fluid-tight seal with the shaft 44 to prevent fluid leakage thereby. A bell-crank 46, which may be more clearly seen in FIG. 2, is mounted on the end of the shaft 44 extending into the interior of the bonnet 38. A connecting link 48 is pivotally mounted at 50 on one end of the bell-crank 46 and is pivotally connected with a valve head assembly 52 at 54.

FIGS. 3 and 4 illustrate the details of construction of the valve head assembly 52. The valve head assembly 52 includes a valve stem 56 which has a circumferentially extending flange 58 located near the upper end thereof and has the other end portion provided with threads 60. Mounted on the valve stem 56 adjacent the circumferentially extending flange 58 is an upper valve head 62. Positioned on the stem 56 and in engagement with the lower end of the upper valve head 62 is a spacer member 64. A lower valve head 66 is also positioned on the stem 56 and has its upper end in engagement with the lower end of the spacer member 64. A washer 68 encircles the stem 56 and is in engagement with the lower end of the lower valve head 66. The upper valve head 62, spacer member 64, lower valve head 66, and the washer 68 are retained on the valve stem 56 by a threaded nut 70 which is engaged with the threads 60 on the valve stem 56.

The upper valve head 62 and the lower valve head 66 are identical in all respects except for size. In FIG. 3 the upper valve head 62 is shown in cross-sectiton, while the lower valve head 66 is shown in elevation. The valve heads are preferably constructed by molding from a natural or synthetic rubber, a plastic, or other suitable resilient material, depending upon the type of fluid to be handled by the valve 10. Each of the valve heads 62 and 66 includes a generally frusto-spherical portion 72 and a cylindrical portion 74 extending symmetrically from the curved surface of the frusto-spherical portion 72 on a projection of the radius thereof. A plurality of radially projecting guide members 76 are illustrated as projecting from the frusto-spherical portion 72 and extending along the cylindrical portion 74. The preferred form of the guide members 76 is illustrated more clearly in FIG. 4. The frusto-spherical portion 72 of the valve heads 62 and 66 has a slightly larger diameter than the maximum dimension of the radially projecting guide members 76, providing an annular seating surface 90 thereon.

Each of the valve heads 62 and 66 also includes a disc-like reinforcing member 78 having a central bore 80 extending therethrough and adapted to fit closely about a tubular reinforcing member 82 which extends axially through the valve heads 62 and 66. The reinforcing member 78 is formed with a counterbore 84 which provides a downwardly facing shoulder 86. The shoulder 86 on the reinforcing member 78 cooperates with an upwardly facing shoulder 88 provided on the exterior of the tubular reinforcing member 82 so that the reinforcing members 78 and 82 are mutually supporting. As previously mentioned, the valve heads 62 and 66 are preferably constructed by molding. The reinforcing member 78 and the tubular reinforcing member 82 will be encased in, and permanently bonded to, the resilient material used in constructing the valve heads 62 and 66 during the molding operation.

The upper aperture 32 (see FIG. 1) is made slightly larger in diameter than the lower aperture 34 and, correspondingly, the upper valve head 62 which mates with the seating surface surrounding the aperture 32 is slightly larger in diameter than the lower valve head 66 which mates with the seating surface surrounding the lower aperture 34. The upper aperture 32 and the lower valve head 66 are so constructed that the valve head assembly 52 may be inserted through the stem opening 18 and the upper aperture 32 to the position shown in FIG. 1, without disassembling the valve head assembly 52. In order to make the valve 10 as nearly balanced as possible with respect to fluid pressure acting on the valve head assembly 52, the apertures 32 and 34 are made very close to the same size, and the lower valve head 66 will have to be forced through the upper aperture 32 in order to assemble the valve.

The spacer member 64 is of such length that the upper valve head 62 and the lower valve head 66 are spaced so that they will simultaneously engage the seating surfaces surrounding the apertures 32 and 34, respectively. Due to the construction of the valve heads 62 and 66 from resilient material, the length of the spacer member 64 is considerably less critical than is true in balanced valves previously constructed. Thus, the spacer member 64 always bears at at least one of its ends (both ends in the embodiment illustrated in FIGURE 7 and hereinafter described) against a flexible resilient material, and the spacing between the valve heads 62 and 66 can thus be automatically adjusted by the use of the linkage 48.

The valve 10 is illustrated in the closed position in FIG. 1, and in the open position in FIG. 5. To open the valve, the shaft 44 is rotated, rotating the bell-crank 46 therewith. As viewed in FIG. 2, the direction of rotation necessary to open the valve 10 is in a clockwise direction about the shaft 44. Clockwise rotation of the bell-crank 46 lifts the linkage 48 and the valve head assembly 52 which is pivotally attached thereto. The valve head assembly 52 is raised to a position as shown in FIG. 5, permitting fluid flow from the inlet 14 and the chamber 24 through the upper and lower apertures 32 and 34 around the guide members 76 as indicated by the arrows. Fluid flowing through the upper aperture 32 moves into the valve stem opening 18, through the passageway 36 in the valve body 12, and then to the outlet opening 16. Fluid flowing through the lower aperture 34 passes directly into the outlet opening 16.

To close the valve 10, i.e., to return the various parts to the positions as shown in FIGS. 1 and 2, the shaft 44 is rotated in a counterclockwise direction as viewed in FIG. 2. Counterclockwise rotation of the shaft 44 rotates the bell-crank 46 therewith, moving the linkage 48 and the attached valve head assembly 52 downwardly. As previously mentioned, the upper valve head 62 and the lower valve head 66 are spaced so that the sealing surfaces 90 on each of the valve heads will engage the seating surfaces surrounding the upper aperture 32 and the lower aperture 34 simultaneously.

Should the distance between the surfaces 90 on the upper valve head 62 and the lower valve head 66 be slightly greater than the distance between the seating surfaces on the upper and lower apertures 32 and 34, the shaft 44 can be further rotated, deforming the surface 90 on the lower valve head 66 until the surface 90 on the upper valve head 62 sealingly engages the surface surrounding the upper aperture 32. Should the distance between the seating surfaces 90 be less than the distance between the seating surfaces on the apertures 32 and 34, the shaft 44 can be rotated, deforming the seating surface 90 on the upper valve head 62 until the seating surface 90 on the lower valve head 66 comes into engagement with the surface surrounding the lower aperture 34. Thus, it can be seen that the accuracy to which the valve head assembly 52 must be held can be substantially reduced by use of the resilient valve heads 62 and 66.

FIG. 6 illustrates a slightly modified version of a valve head assembly which is designated by the reference character 152. As can be seen by comparing FIGS. 3 and 6, the valve head assembly 52 and the valve head assembly 152 are identical in all respects with the exception of the provision on the valve head assembly 152 of a stop member 154. As shown in FIG. 6, the valve head assembly 152 includes, in addition to the stop member 154, a valve stem 156, upper and lower valve heads 158 and 160, respectively, a spacer member 162 holding the valve heads 158 and 160 in spaced relation, and a threaded nut 164 threadedly engaged with the valve stem 156 to retain the stop member 154, upper and lower valve heads 158 and 160, and the spacer member 162 on the valve stem 156. The stop member 154 may be described as having a central, disc-like portion 166 which is provided with an aperture 168 sized to closely fit the valve stem 156. The stop member 154 is provided with a downturned peripheral flange portion 170.

When installed in the valve 10, the valve head assembly 152 operates in a manner nearly identical to that of the valve head assembly 52. As described in connection with the valve head assembly 52, the valve head assembly 152 can also be inserted in the valve 10 as an assembled unit. The only difference in operation of the valve 10 with the valve head assembly 152 installed therein occurs during the closure of the valve. After the valve heads 158 and 160 have sealingly engaged the seating surfaces surrounding the upper and lower apertures 32 and 34, the downturned flange portion 170 of the stop member 154 will engage the top surface of the upper partition 26. The engagement of the stop member 154 with the partition 26 eliminates any possibility of extruding the upper and lower valve heads 158 and 160 through the upper and lower apertures 32 and 34, respectively. More importantly, in high pressure service, the stop member 154 provides a positive stop, limiting movement of the upper and lower valve heads 158 and 160 against their seats. This permits the resilient material of the valve heads to establish a seal with the respective seats, but prevents the material from being cut through by the seats under the impress of the high pressure.

FIGS. 7 and 8 illustrate a different embodiment of a valve head assembly, designated generally by the reference character 252. As shown therein, the valve head assembly 252 includes a valve stem 254, upper and lower valve heads 256 and 258, respectively, a spacer member 260 holding the valve heads 256 and 258 in spaced relation, and a threaded nut 262. With the exception of the valve heads 256 and 258, the various parts of the valve head assembly 252 are identical to the corresponding parts of the valve head assembly 52. While certain structural differences, which will be described in detail, are present in the valve heads 256 and 258, it should be pointed out that the exterior configuration is identical to that of the corresponding valve heads 62 and 66 of the valve head assembly 52.

The valve heads 256 and 258 are identical in construction except for size. In view of this, only the structure of the valve head 256 will be described in detail, it being understood that the valve head 258 is similarly constructed. The valve head 256 includes a reinforcing member 264 constructed of a relatively rigid plastic, such as a reinforced phenolic, embedded in an outer covering 265 formed a natural or synthetic rubber, a plastic, or other suitable resilient material, depending upon the type of fluid to be handled by the valve 10. As previously mentioned, the exterior configuration of the valve head 256 is identical to the valve head 62.

The reinforcing member 264 consists of an upper, disc-like portion 266 that is similar in size and shape to the reinforcing member 78 in the valve head 62; a cylindrical portion 267 (see FIG. 8) depending from said disc-like portion 266; and a plurality of guide supports 268 formed integrally with the disc-like reinforcing member 266 and the cylindrical portion 267, and extending downwardly from the member 266 and which are radially spaced about the cylindrical portion 267 to support an equal number of guide members 270. A central bore 272 extends through the reinforcing member 264 and outer covering 265 so that the valve head 256 can be positioned on the valve stem 254.

When the valve head assembly 252 is installed in the valve 10, it functions in the identical manner as does the valve head assembly 52 previously described. It should be pointed out, however, that the valve head assembly 252 is preferred when the valve 10 is to be used with high corrosive materials. The utilization of corrosive resistant plastic to form the reinforcing member 264 eliminates the possibility of valve failure in the event that the outer covering 265 is not completely homogeneous. Furthermore, the provision of the guide supports 268 has the advantage of a more rigid and positive guiding action during opening and closing of the valve 10. If desired, the stop member 154, illustrated in FIG. 6, can be utilized with the valve head assembly 252.

Although it has been previously mentioned, it should be pointed out that the structure of the valve body 12, and the arrangement of the upper and lower partitions 26 and 28 in particular, greatly alleviates dimensional changes occurring in the valve body 12 as a result of environmental temperature changes. Also, the use of resilient materials in forming the upper and lower valve heads effectively eliminates corrosion and erosion of the valve heads. It will be noted that the metal reinforcing members 78 and 82 in the heads are substantially completely covered and protected by the resilient material.

Due to the resiliency of the valve heads, changes of the entire valve head assembly may be more easily made in the field. If a valve head assembly received from the factory varies slightly from the dimension between the seating surfaces in the valve body 12, the spacer member 64 can be removed and either filed off or turned to a slightly shorter length to close the distance between the valve heads, or washers or other shim-type materials can be added between the spacer member 64 and one or both of the valve heads to lengthen the distance between the seating surfaces.

It should be emphasized that the structural arrangement of the valve body 12 is such that a very large flow passageway 36 has been provided while maintaining a relatively small overall size and weight of the valve. As previously mentioned, the provision of a large flow passageway reduces the tendency of the valve to become plugged or obstructed when passing fluid containing solids, such as paraffin, therethrough.

It should be understood that the embodiments shown herein are by way of example only and that many modifications and changes can be made therein without departing from the spirit of the invention or from the scope of the annexed claims.

What I claim is:

1. A valve head assembly comprising:
   an elongated stem having a circumferentially extending flange located on one end portion and having the other end portion threaded;
   a first valve head formed from resilient material located on said stem adjacent said flange;
   a tubular spacer member on said stem adjacent said first valve head;
   a second valve head formed from a resilient material located on said stem and spaced from said first valve head by said spacer member;
   said valve heads including:
      a generally frusto-spherical upper portion, a cylindrical portion extending from said frusto-spherical portion,
      a plurality of radially projecting guide members extending from said frusto-spherical portion and along said cylindrical portion,
      a relatively rigid reinforcing member imbedded in said frusto-spherical member, and
      a tubular member extending axially through said cylindrical portion and in supporting engagement with said reinforcing member; and,
   a nut engaging the threads on said stem, whereby said valve heads and spacer member are retained on said stem.

2. A valve comprising:
   a valve body having:
      an inlet opening,
      a chamber connected with said inlet opening,
      a valve stem opening,
      an outlet opening spaced from said valve stem opening and connected therewith by a passageway, and
      a pair of aligned apertures forming a pair of valve seats, one of said apertures connecting said chamber with said outlet opening and the other of said apertures connecting said chamber with said stem opening and being of slightly larger diameter than said one aperture;
   an elongated valve stem extending through said apertures having a circumferential flange on one end portion thereof and having the other end portion threaded;
   a first valve head on said stem adjacent said circumferential flange arranged to sealingly engage the seat surrounding the aperture connecting said stem opening and chamber;
   a tubular spacer member located on said stem adjacent said first valve head;
   a second valve head on said stem spaced from said first valve head by said spacer member arranged to simultaneously with said first valve head sealingly engage the seat surrounding the aperture connecting said outlet opening and chamber;
   said valve heads including:
      a generally frusto-spherical upper portion,
      a cylindrical portion extending from said frusto-spherical portion,
      a plurality of radially projecting guide members extending from said frusto-spherical portion and along said cylindrical portion,
      a relatively rigid reinforcing member imbedded in said frusto-spherical portion, and
      a tubular member extending axially through said cylindrical portion and in supporting engagement with said reinforcing member;
   a nut engaging the threads on said stem, whereby said valve heads and spacer member are retained on said stem;
   a bonnet secured to said valve body around said stem opening; and,
   linkage means connected with said stem ad extending through said bonnet for moving said valve heads toward and away from said seats.

3. A valve comprising:
   a valve body having:
      an inlet opening;
      a chamber connected with said inlet opening;
      a valve stem opening:
      an outlet opening spaced from said valve stem opening and connected therewith by a passageway; and
      a pair of aligned apertures forming a pair of valve seats, one of said apertures connecting said chamber with said outlet opening and the other of said apertures connecting said chamber with said valve stem opening;
   a valve stem extending through said apertures;
   valve heads on said valve stem spaced to simultaneously engage said valve seats, said valve heads each including:
      a relatively rigid reinforcing member;
      a resilient material partially surrounding said reinforcing member so that said reinforcing member supports said resilient material upon engagement of the valve heads with said seats; and
      downwardly extending guide means integral with the resilient material of each of said valve heads;
   a tubular member extending axially through each of said valve heads and engageable with the reinforcing members of said heads to provide axial and radial support for said resilient material;
   a bonnet secured to said body around said valve stem opening; and
   linkage means connected with said valve stem and extending through said bonnet for moving said valve heads towards and away from said seats.

4. A valve head assembly comprising:
an elongated stem having a circumferentially extending flange located on one end portion and having the other end portion threaded;
a first valve head formed from a resilient material located on said stem adjacent said flange, said valve head having a relatively rigid disc-shaped reinforcing member embedded in said resilient material, and further having a tubular member extending axially through said head and in engagement with said reinforcing member;
a tubular spacer member on said stem adjacent said first valve head;
a second valve head formed from a resilient member located on said stem and spaced from said first valve head by said spacer member, said second valve head having a relatively rigid disc-shaped reinforcing member embedded in the resilient material thereof, and further having a tubular member extending axially through said second valve head and in engagement with the reinforcing member thereof; and
a nut engaging the threads on said stem whereby said valve heads and spacer member are retained on said stem.

5. A valve head assembly comprising:
an elongated stem having a circumferentially extending flange located on one end portion and having the other end portion threaded;
a pair of valve heads located on said stem, said valve heads each including:
   a relatively rigid reinforcing member having an upper, disc-like portion and a cylindrical portion projecting from said disc-like portion;
   a resilient material encasing said reinforcing member, said resilient material including
      a generally frusto-spherical upper portion surrounding the disc-like portion of said relatively rigid reinforcing member;
      a cylindrical portion extending from said frusto-spherical portion and substantially encompassing the cylindrical portion of said rigid reinforcing member; and
      a plurality of radially projecting guide members extending along said frusto-spherical portion and cylindrical portion of said resilient material;
a spacer member on said stem and disposed between said valve heads; and
a nut engaging the threads on said stem whereby said valve heads and spacer member are retained on said stem.

6. A valve comprising:
a valve body having at least two, spaced parallel planar walls and a third planar wall extending perpendicularly to and interconnecting said two spaced parallel walls, said valve body further having an inlet opening, an outlet opening, and a valve stem opening, said valve stem opening and outlet opening being aligned, and said inlet opening extending substantially normal to the direction of alignment of said valve stem opening and said outlet opening;
first and second substantially planar partitions extending in parallel, spaced relation from the inlet opening in the valve body and a portion of the way thereacross, said partitions each being secured at oppposed parallel edges to said parallel walls of the valve body, said first partition having an aperture extending therethrough providing communication with said stem opening, and said second partition having an aperture extending therethrough providing communication with said outlet opening, said apertures in said first and second partitions being axially aligned;
a third planar partition extending normal to, and secured between, the inner ends of said first and second partitions, said third partition defining with said first and second partitions and with said parallel walls of the valve body, a chamber of rectangular transverse and longitudinal cross-section, said chamber communicating with said inlet opening, said third partition being spaced from said third planar wall of said valve body to define a passageway extending between said stem opening and outlet opening, said passageway having a minimum dimension, as measured directly from said third partition, to said third wall of the valve body, that is greater than one-half the maximum dimension of either of said apertures;
a valve stem extending through said apertures;
valve heads on said valve stem and spaced from each other to simultaneously engage the portions of said first and second partitions surrounding and defining the apertures extending therethrough, said heads being formed from a resilient material and having guide means thereon for guiding the movement of said heads relative to said seats;
a bonnet secured to said body around said valve stem opening; and
linkage means connected with said stem and extending through said bonnet for moving said valve heads toward and away from said seats.

7. A valve as defined in claim 6 and further characterized to include a rigid spacer surrounding said valve stem and extending between said valve heads, at least one end of said spacer bearing against the resilient material of one of said valve heads whereby the axial distance separating said valve heads as measured along said valve stem can be varied by manipulation of said linkage means to compress the resilient material in contact with said spacer.

References Cited by the Examiner
UNITED STATES PATENTS

| | | | |
|---|---|---|---|
| 573,540 | 12/1896 | Schumacher | 137—625.36 |
| 633,463 | 9/1899 | Marks | 137—625.36 |
| 1,994,660 | 3/1935 | Painter | 137—625.36 X |
| 2,888,238 | 5/1959 | Leathers et al. | 251—358 |
| 2,998,027 | 8/1961 | Sharp | 137—625.36 |
| 3,153,424 | 10/1964 | Acker | 127—625.36 X |

M. CARY NELSON, *Primary Examiner.*

ARNOLD ROSENTHAL, *Examiner.*